United States Patent
Bektas et al.

(10) Patent No.: US 9,678,785 B1
(45) Date of Patent: Jun. 13, 2017

(54) VIRTUAL MACHINE RESOURCE ALLOCATION BASED ON USER FEEDBACK

(71) Applicant: International Business Machines Corporation, Armonk, NY (US)

(72) Inventors: Umit Bektas, Cracow (PL); Pawel T. Januszek, Cracow (PL); Piotr Kania, Cracow (PL); Konrad K. Skibski, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/953,478

(22) Filed: Nov. 30, 2015

(51) Int. Cl.
G06F 9/455 (2006.01)

(52) U.S. Cl.
CPC .. G06F 9/45558 (2013.01); *G06F 2009/4557* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 6,598,079 B1* | 7/2003 | Pal | ........................ | G06F 9/5011 709/203 |
| 8,156,502 B1* | 4/2012 | Blanding | ................... | G06F 9/50 718/100 |
| 8,767,535 B2 | 7/2014 | Uysal et al. | | |
| 8,832,239 B2 | 9/2014 | Assuncao et al. | | |
| 8,856,783 B2 | 10/2014 | Sharp et al. | | |
| 2006/0143617 A1* | 6/2006 | Knauerhase | .............. | G06F 9/50 718/104 |
| 2009/0323712 A1* | 12/2009 | Bodin | ................. | H04L 12/5695 370/431 |
| 2010/0175070 A1* | 7/2010 | Baba | ........................ | G06F 9/505 718/105 |
| 2010/0257523 A1* | 10/2010 | Frank | ................... | G06F 9/45558 718/1 |
| 2011/0083122 A1* | 4/2011 | Chen | ................... | G06F 11/3664 717/124 |

(Continued)

FOREIGN PATENT DOCUMENTS

| | | |
|---|---|---|
| CN | 103870341 A | 6/2014 |
| WO | 2015027866 A1 | 3/2015 |

OTHER PUBLICATIONS

Selokar et al., "Survey on Dynamic Resource Allocation Using Virtual Machines for Cloud Computing Environment," International Journal of Advanced Research in Computer and Communication Engineering, May 2014, pp. 6449-6452, vol. 3, Issue 5, Copyright to IJARCCE, ISSN (Online) : 2278-1021, ISSN (Print) : 2319-5940.

(Continued)

*Primary Examiner* — Benjamin Wu
*Assistant Examiner* — Jorge A Chu Joy-Davila
(74) *Attorney, Agent, or Firm* — Robert J. Shatto

(57) ABSTRACT

A computer system may receive two or more messages. Each message may be sent by a user of one of a plurality of virtual machines that are executing on a host machine. Each message may request an adjustment of resource entitlements for the virtual machine. The computer system may aggregate the two or more messages. The computer system may determine whether a particular resource template type associated with at least one of the two or messages should be adjusted based on the aggregated messages.

23 Claims, 6 Drawing Sheets

(56) References Cited

U.S. PATENT DOCUMENTS

| | | | |
|---|---|---|---|
| 2012/0054765 A1* | 3/2012 | Lee | G06F 9/5027 718/104 |
| 2013/0074072 A1* | 3/2013 | Kennedy | G06F 9/44505 718/1 |
| 2013/0139152 A1* | 5/2013 | Chang | G06F 9/45545 718/1 |
| 2013/0151707 A1* | 6/2013 | Boutin | G06F 9/5077 709/226 |
| 2014/0058871 A1* | 2/2014 | Marr | G06F 9/45533 705/26.1 |
| 2014/0115589 A1* | 4/2014 | Marinelli, III | G06F 9/466 718/101 |
| 2014/0137110 A1* | 5/2014 | Engle | G06F 9/5022 718/1 |
| 2014/0201735 A1* | 7/2014 | Kannan | G06F 9/45558 718/1 |
| 2015/0234671 A1* | 8/2015 | Tomita | G06F 9/45558 718/1 |
| 2015/0355932 A1* | 12/2015 | Hiebert | G06F 9/45558 718/1 |

OTHER PUBLICATIONS

Anonymous, "Infrastructure Autoprovision and Learning Based on User's Feedback," An IP.com Prior Art Database Technical Disclosure, Jan. 28, 2015, 3 pages, Copyright © 2009-2015, IP.com No. 000240390.

* cited by examiner

300

| Resource State | CPU | Memory | Storage | Time |
|---|---|---|---|---|
| Low | 75% | 75% | 75% | 30 min. |
| Medium | 80% | 80% | 80% | 15 min. |
| High | 90% | 90% | 90% | 10 min. |
| Critical | 95% | 95% | 95% | 5 min. |

| Resource State | Maximum Resource Adjustment | Maximum Adjustment Time |
|---|---|---|
| Low | 10% | 30 min. |
| Medium | 25% | 1 hr. |
| High | 50% | 2 hr. |
| Critical | 100% | 4 hr. |

| Message # | Template ID | VM ID | Resource |
|---|---|---|---|
| 1 | 1 | 1 | CPU |
| 2 | 3 | 5 | Memory |
| 3 | 1 | 2 | CPU |
| 4 | 1 | 3 | CPU |
| 5 | 2 | 4 | Memory |
| 6 | 3 | 6 | CPU |
| 7 | 3 | 7 | Storage |

| Message # | Template ID | VM ID | Resource |
|---|---|---|---|
| 1 | 1 | 1 | CPU |
| 3 | 1 | 2 | CPU |
| 4 | 1 | 3 | CPU |

512

| Message # | Template ID | VM ID | Resource |
|---|---|---|---|
| 5 | 2 | 4 | Memory |

513

| Message # | Template ID | VM ID | Resource |
|---|---|---|---|
| 2 | 3 | 5 | Memory |
| 6 | 3 | 6 | CPU |
| 7 | 3 | 7 | Storage |

FIG. 5B

VIRTUAL MACHINE RESOURCE ALLOCATION BASED ON USER FEEDBACK

BACKGROUND

The present disclosure relates generally to the field of computer systems, and more particularly to adjusting resource allocations for virtual machines based on user feedback.

Hypervisors, also referred to as virtual machine managers, manage one or more virtual machines. Hypervisors can allocate system resources to virtual machines by assigning shares of physical devices/hardware to the virtual machines that run on, and are managed by, the hypervisor. This virtualization can allow multiple virtual machines to run on top of a single physical host by sharing host resources between the multiple virtual machines.

SUMMARY

Embodiments of the present disclosure include a method, computer program product, and system for adjusting resource allocations to virtual machines based on user feedback. A computer system may receive two or more messages. Each message may be sent by a user of one of a plurality of virtual machines that are executing on a host machine. Each virtual machine may have an associated resource template type that establishes a set of resource entitlements for one or more system resources allocated to the virtual machine. Each message may request an adjustment of resource entitlements for the virtual machine. The computer system may aggregate the two or more messages. The computer system may determine whether a particular resource template type associated with at least one of the two or messages should be adjusted based on the aggregated messages.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3A illustrates an example resource state policy for a virtual machine, in accordance with embodiments of the present disclosure.

FIG. 3B illustrates an example resource adjustment policy for a virtual machine, in accordance with embodiments of the present disclosure.

FIG. 5A illustrates an example set of seven messages requesting an adjustment to a resource entitlement, in accordance with embodiments of the present disclosure.

FIG. 5B illustrates the seven messages from FIG. 5A aggregated into three groups according to the resource template for the virtual machines requesting the adjustments to a resource entitlement, in accordance with embodiments of the present disclosure.

Figure 1:
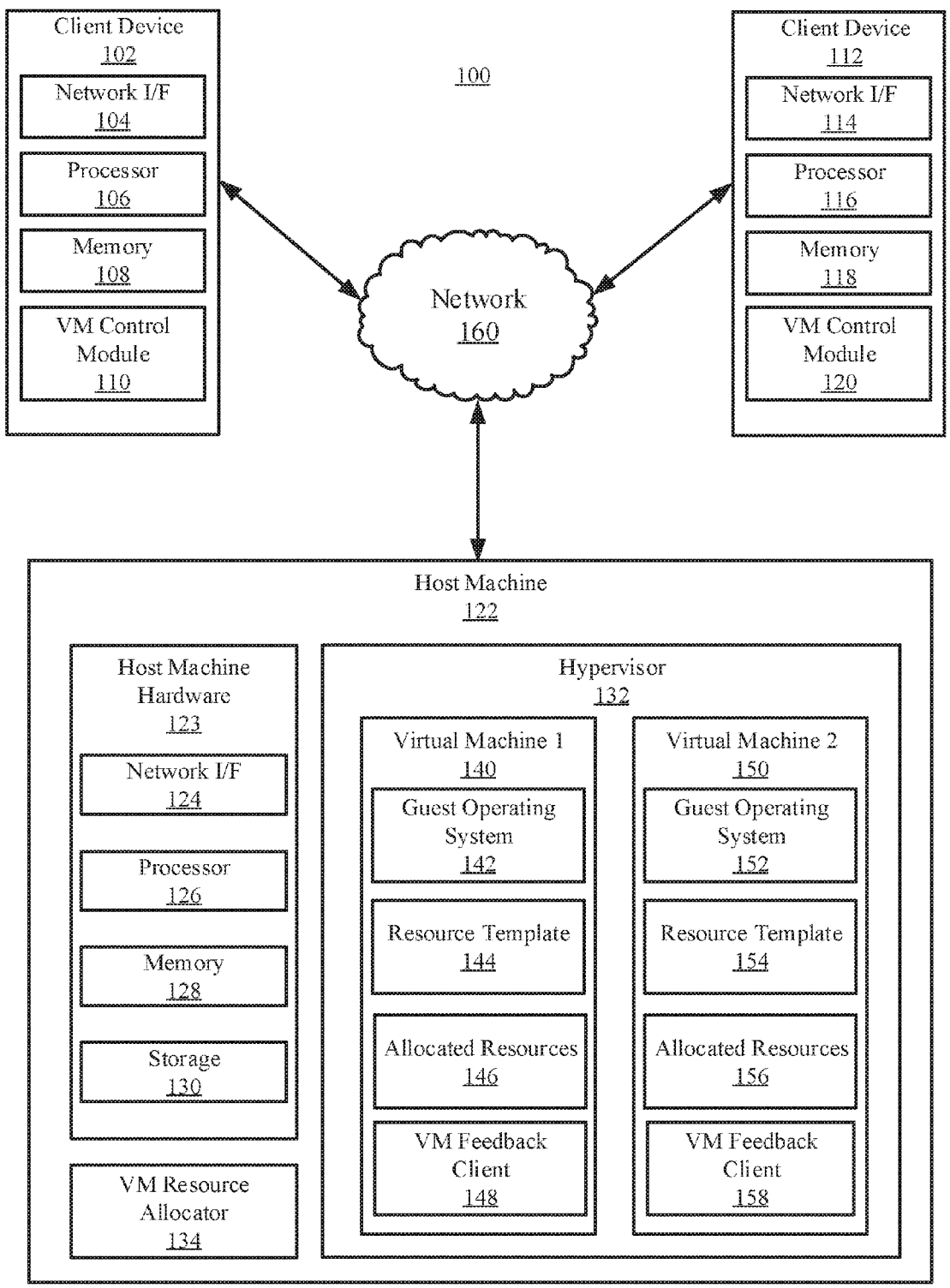
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer systems, and in particular to adjusting resource allocations to virtual machines based on user feedback. While the present disclosure is not necessarily limited to such applications, various aspects of the disclosure may be appreciated through a discussion of various examples using this context.

A hypervisor executing on a host machine may manage allocated resources for one or more virtual machines. Each virtual machine may have a resource template based on a resource template type that defines resource entitlements for the virtual machine. The resource entitlements may include the amount of one or more system resources (e.g., CPU, memory, storage) that are allocated to the virtual machine. As a user runs applications on a virtual machine, he may notice that the virtual machine is sluggish or unresponsive. Accordingly, he may wish to increase the amount of system resources dedicated to the virtual machine.

In some embodiments, the user may send a request for additional resources to a computer system or host machine (or a module executing thereon, such as a virtual machine (VM) resource allocator). The VM resource allocator may determine a resource state of the virtual machine based on how much of the allocated resources the virtual machine is using. For example, the VM resource allocator may determine the resource state of the virtual machine by comparing the CPU utilization level of the virtual machine to a resource state policy. The VM resource allocator may then determine, based on the determined resource state of the virtual machine, whether to grant the request.

In some embodiments, the VM resource allocator may collect (or aggregate) the messages it receives that request additional system resources. The VM resource allocator may then determine, based on the aggregated messages, whether a particular resource template type should be adjusted. The VM resource allocator may compare the number of requests it receives from a virtual machine associated with the particular resource template to a threshold. If the number of requests exceeds the threshold, the VM resource allocator may modify the resource template type.

Turning now to the figures, FIG. 1 illustrates a block diagram of an example computing environment 100 in which illustrative embodiments of the present disclosure may be implemented. In some embodiments, the computing environment 100 may include two client devices 102 and 112 and a host machine 122.

Consistent with various embodiments, the client devices 102 and 112 and the host machine 122 may be computer systems. The client devices 102 and 112 and the host machine 122 may include one or more processors 106, 116, and 126 and one or more memories 108, 118, and 128, respectively. The client devices 102 and 112 and the host machine 122 may be configured to communicate with each other through an internal or external network interface 104, 114, and 124. The network interfaces 104, 114, and 124 may be, e.g., modems or network interface cards. The client devices 102 and 112 and/or the host machine 122 may be equipped with a display or monitor. Additionally, the client devices 102 and 112 and/or the host machine 122 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.).

In some embodiments, the host machine hardware 123 may also include storage 130. The storage may be volatile or non-volatile computer system storage media. By way of example only, storage 130 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, storage 130 can include flash memory, e.g., a flash memory stick drive or a flash drive.

The client devices 102 and 112 and the host machine 122 may be distant from each other and communicate over a network 160. In some embodiments, the host machine 122 may be a central hub from which client devices 102 and 112 can establish a communication connection, such as in a client-server networking model. Alternatively, the host machine 122 and client devices 102 and 112 may be configured in any other suitable networking relationship (e.g., in a peer-to-peer configuration or using any other network topology).

In some embodiments, the network 160 can be implemented using any number of any suitable communications media. For example, the network 160 may be a wide area network (WAN), a local area network (LAN), an internet, or an intranet. In certain embodiments, the client devices 102 and 112 and the host machine 122 may be local to each other, and communicate via any appropriate local communication medium. For example, the client devices 102 and 112 and the host machine 122 may communicate using a local area network (LAN), one or more hardwire connections, a wireless link or router, or an intranet. In some embodiments, the client devices 102 and 112 and the host machine 122 may be communicatively coupled using a combination of one or more networks and/or one or more local connections. For example, the first client device 102 may be hardwired to the host machine 122 (e.g., connected with an Ethernet cable) while the second client device 112 may communicate with the host device using the network 160 (e.g., over the Internet).

In some embodiments, the network 160 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 160.

In some embodiments, the client devices 102 and 112 may enable users to interact with one or more virtual machines (VMs) running on the host machine 112. For example, the client devices 102 and 112 may include VM control modules 110 and 120 and a user interface (UI). The VM control modules 110 and 120 may provide interoperability services allowing a user of a client device 102 and 112 to control a virtual machine running on the host machine 122. The VM control modules 110 and 120 may be in the form of a web browser or any other suitable software module, and the UI may be any type of interface (e.g., command line prompts, menu screens, graphical user interfaces). The UI may allow a user to interact with the remote device 102 to operate, using the VM control module 110, one or more one or more virtual machines executing on the host device 112. For example, a user of the first client device 102 may control a first virtual machine 140 executing on the host machine 122 using the first VM control module 110. Likewise, a user of the second client device 112 may control a second virtual machine 150 executing on the host machine 122 using the second VM control module 120.

In some embodiments, the host machine 122 may include a hypervisor 132, also referred to as a virtual machine manager, and a VM resource allocator 134. The hypervisor 132 may host the first virtual machine 140 and the second virtual machine 150. The virtual machines 140 and 150 may include guest operating systems 142 and 152 and resource templates 144 and 154, respectively. The resource templates 144 and 154 may establish one or more resource entitlements. Each resource entitlement may correspond to a specific system resource (e.g., CPU, memory, and/or storage). The resource entitlements may establish the amount of the system resources that are allocated to the virtual machines 140 and 150. For example, the resource templates 144 and 154 may determine the allocated resources 146 and 156 for the virtual machines 140 and 150.

In some embodiments, the allocated resources 146 and 156 may be logical partitions, or shares, of the host machine hardware 123. In other embodiments, the host machine hardware 123 may include two or more physical partitions (or hardware partitions). The hypervisor 132, or the VM resource allocator 134, may assign one or more of the physical partitions to a virtual machine. Accordingly, in these embodiments, the allocated resources 146 and 156 may include physical partitions of the host machine hardware 123.

The virtual machines 140 and 150 may also include a VM feedback client 148 and 158, respectively. The VM feedback clients 148 and 158 may enable a user of a virtual machine to provide feedback regarding the resource entitlements for the virtual machine. For example, a user may request additional system resources be allocated to the first virtual machine 140 using the first VM feedback client 148.

The VM feedback clients 148 and 158 may also enable a user to determine a resource state for the virtual machines 140 and 150. The VM feedback clients 148 and 158 may include a resource state policy for the virtual machines 140 and 150. The resource state policies may establish a set of parameters defining one or more resource states for the virtual machines 140 and 150 based on a system resource utilization level for the virtual machines. For example, the resource state policy for the first virtual machine 140 may indicate that the virtual machine is in a critical resource state if the utilization level of any system resource (e.g., CPU, memory, or storage) exceeds 95% of the allocated amount of that system resource for a period of more than 5 minutes. Accordingly, the VM feedback client 148 for the first virtual machine 140 may alert the user to the resource state of the first virtual machine, and allow the user to request an adjustment to the resource entitlement for the critical system resource. An example resource state policy is discussed in more detail in reference to FIG. 3A.

The VM resource allocator 134 may be configured to allocate system resources (e.g., portions of the host machine hardware 123) to virtual machines (e.g., the first virtual machine 140 and the second virtual machine 150) hosted by the hypervisor 132. The VM resource allocator 134 may be configured to assign a resource template to each virtual machine (e.g., the first resource template 144 to the first virtual machine 140). The VM resource allocator 134 may also be configured to receive feedback (e.g., requests for an adjustment to a resource entitlement) from users of the virtual machines 140 and 150. The VM resource allocator 134 may then determine whether to temporarily adjust the resource entitlements for the virtual machine. While illustrated as a separate component in FIG. 1, the VM resource allocator 134 may be part of the hypervisor 132 in some embodiments.

The VM resource allocator 134 may use a resource adjustment policy that establishes a set of resource adjustment criteria based on the resource state of the virtual machine requesting the adjustment. For example, the resource adjustment policy may indicate that virtual machines in the critical resource state may be granted up to a 100% increase in the critical system resource(s) (e.g., any system resource with a utilization level greater than 95%) for up to four hours. The VM resource allocator 134 may compare the maximum allowed adjustment to the requested adjustment to determine whether to grant the request. An example resource adjustment policy is discussed in more detail in reference to FIG. 3B.

The VM resource allocator 134 may also be configured to aggregate messages from one or more virtual machines to determine whether to permanently adjust a resource template type for at least a subset of virtual machines associated with the resource template. The VM resource allocator 134 may aggregate messages sent by users of the virtual machines 140 and 150 according to the resource templates 144 and 154 used by the virtual machines. For example, all messages received from virtual machines that use a first resource template type (e.g., including the first virtual machine 140) may be aggregated together. The VM resource allocator 134 may then determine, based on the number of messages received, whether to adjust the first resource template type. In some embodiments, the VM resource allocator may adjust the first resource template type only for the virtual machines that are associated with the first resource template type and that sent a request for an adjustment to a resource entitlement.

While FIG. 1 illustrates a computing environment 100 with a single host machine 122 and two client devices 102 and 112, suitable computing environments for implementing embodiments of this disclosure may include any number of client devices and host machines. The various modules, systems, and components illustrated in FIG. 1 may exist, if at all, across a plurality of host machines and client devices.

For example, some embodiments may include two host machines. The two host devices may be communicatively coupled using any suitable communications connection (e.g., using a WAN, a LAN, a wired connection, an intranet, or the Internet). The first host machine may include a first hypervisor that hosts a first plurality of virtual machines, and the second host machine may include a second hypervisor that hosts a second plurality of virtual machines. Either, or both, host machines may also include a VM resource allocator that is configured to allocate resources to the pluralities of virtual machines.

It is noted that FIG. 1 is intended to depict the representative major components of an example computing environment 100. In some embodiments, however, individual components may have greater or lesser complexity than as represented in FIG. 1, components other than, or in addition to, those shown in FIG. 1 may be present, and the number, type, and configuration of such components may vary.

Figure 2:
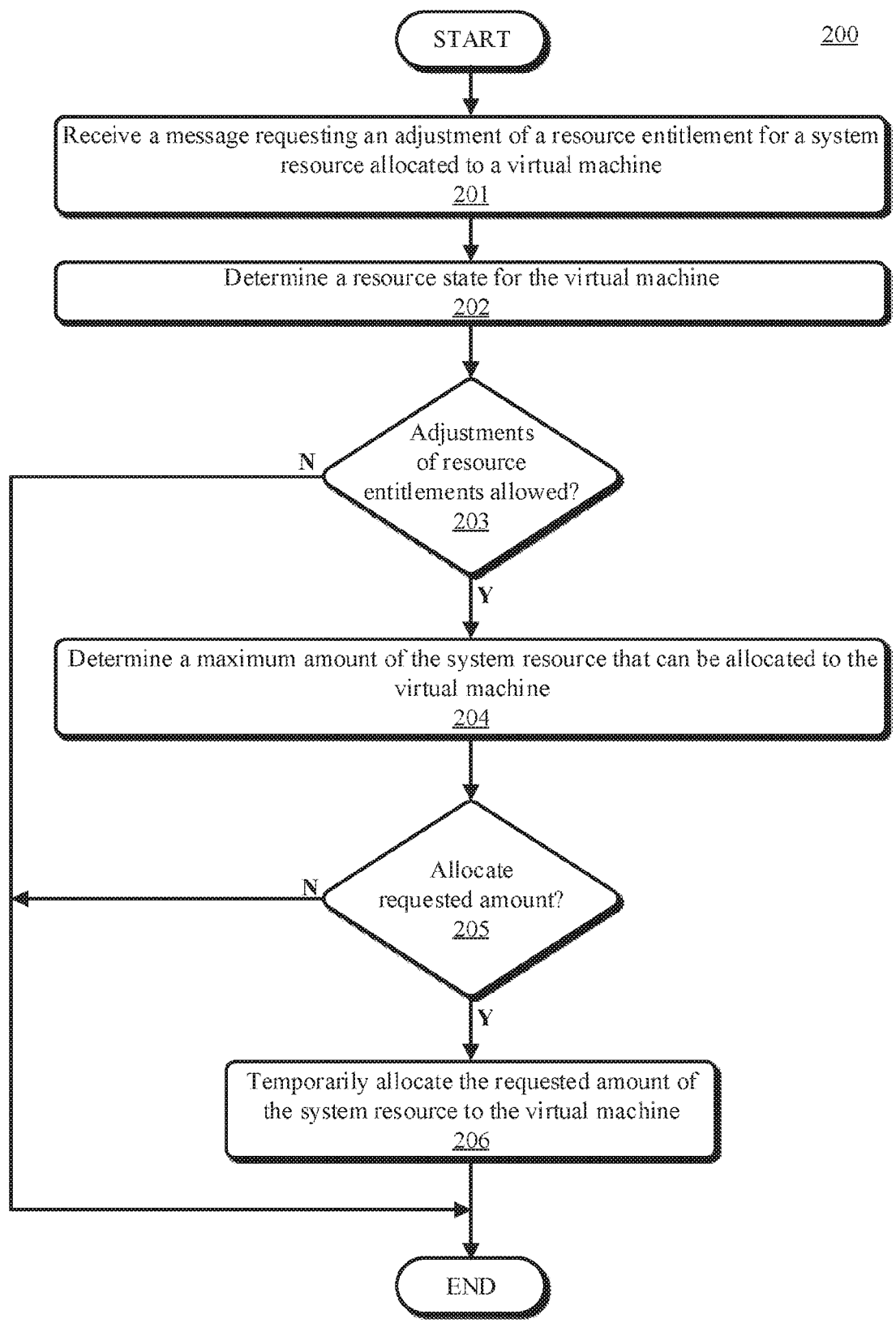
FIG. 2 illustrates a flowchart of an example method for temporarily adjusting a resource entitlement for a virtual machine, in accordance with embodiments of the present disclosure.

FIG. 2 illustrates a flowchart of an example method 200 for temporarily adjusting a resource entitlement for a virtual machine, in accordance with embodiments of the present disclosure. The method 200 may be performed by a computer system, such as the host machine 122 (shown in FIG. 1). In some embodiments, one or more steps or operations of method 200 may be performed by a user, or by the computer system in response to user input. The method 200 may begin at operation 201, where the computer system may receive a message requesting an adjustment of a resource entitlement for a system resource allocated to a virtual machine.

The virtual machine may have an associated resource template. The virtual machine may be assigned its associated resource template by a VM resource allocator (e.g., the VM resource allocator 134 in FIG. 1) when the virtual machine is initialized, for example. The VM resource allocator may select from one or more resource template types when assigning the resource template to the virtual machine. Each resource template type may specify a different allocation of system resources (e.g., CPU, memory, storage). The resource template may be assigned based on the anticipated job to be performed by the virtual machine, an end user's selection, or an amount of money that the end user is willing to pay, among other things.

The resource template for the virtual machine may include one or more resource entitlements. Each resource entitlement may have an associated system resource and an amount of the associated system resource that is currently allocated to the virtual machine. For example, the resource template for the virtual machine may include a first resource entitlement corresponding to memory. The first resource entitlement may specify that the virtual machine is allocated 4 GB of memory.

In some embodiments, the message may be sent to the computer system by a user. For example, a user of a client device (e.g., client device 102 in FIG. 1) may transmit the message using a computer module (e.g., the VM feedback client 148 in FIG. 1) installed on a virtual machine (e.g., the first virtual machine 140 in FIG. 1). The message may include a request for an adjustment of a particular resource entitlement. The particular resource entitlement may be associated with a particular system resource (e.g., CPU, memory, storage) for which the user is requesting an increased allocation. The request may also include a requested amount of the particular system resource desired by the user. The requested amount of the system resource may be greater than the amount currently allocated to the virtual machine according to the resource entitlement.

In some embodiments, the message may include requests for adjustments to more than one resource entitlement. For example, a user may decide that the virtual machine he is using needs additional memory and storage. Accordingly, the user may send a message to a host machine requesting an adjustment to a first resource entitlement (e.g., corresponding to memory) and a second resource entitlement (e.g., corresponding to storage). The message may include an amount of each system resource requested. For example, the message may indicate that the user would like 8 GB of memory (e.g., increased from the 4 GB specified by the first resource entitlement) and 2 TB of storage (e.g., increased from the 1 TB specified by the second resource entitlement).

In some embodiments, the message may include a request to lower the amount of a system resource allocated to the virtual machine. This may be done if the amount that the user pays to use the virtual machine is based, at least in part, on the allocation of system resources to the user. In some embodiments, the message may include a request to increase the amount of a first system resource (e.g., memory) allocated to the virtual machine and decrease the amount of a second system resource (e.g., storage) allocated to the virtual machine.

In some embodiments, the message may include other information, such as a user ID of the user, a virtual machine ID of the first virtual machine, a resource template ID of the resource template, the resource state for the first virtual machine, a user-generated explanation of why the requested amount of the first system resource is requested, and/or a timestamp. The computer system may use this additional information when determining whether to adjust a resource entitlement for a virtual machine.

After receiving the message requesting an adjustment of a resource entitlement at operation 201, the computer system may determine a resource state for the virtual machine at operation 202. The computer system may use a resource state policy for the virtual machine to determine the resource state of the virtual machine. The resource state policy may establish one or more resource states for the virtual machine, and the criteria (e.g., thresholds) that determine which resource state the virtual machine is in. For example, the resource state policy may indicate the amount of a system resource (or percentage of the allocated amount) used by the computer system for each resource state. In some embodiments, every virtual machine managed by the computer system may have the same resource state policy. In other embodiments, each virtual machine may be independently assigned a resource state policy. In some embodiments, a virtual machine's resource state policy may be based on the resource template type assigned to the virtual machine. An example resource state policy is discussed in detail in reference to FIG. 3A.

In some embodiments, the computer system may determine a utilization level of a system resource for the virtual machine. The computer system may then compare the utilization level to a set of resource state thresholds in the resource state policy to determine the resource state of the virtual machine. For example, the resource state policy may have a first threshold at 75% utilization and a second threshold at 90% utilization. A virtual machine that is using less than 75% of an allocated system resource may be considered in a normal resource state. Likewise, a virtual machine that is using 80% of its allocated system resource may be in an elevated resource state, and a virtual machine using 95% of its allocated system resource may be in a critical resource state.

In some embodiments, the resource state policy may also include time thresholds for each resource state. This may be to prevent a virtual machine experiencing a temporary spike in utilization of one or more system resources from being granted an increased allocation of those one or more system resources. Continuing the example from before, the resource state policy may dictate that the virtual machine is only in the elevated resource state if the utilization of one or more system resources exceeds 75% for at least 10 minutes. Likewise, the virtual machine may only be in the critical resource state if the utilization of a system resource exceeds 90% for at least 5 minutes. This may prevent temporary spikes in resource utilizations (such as when starting a large application) from affecting the resource state of the virtual machine because such spikes are unlikely to have a lasting effect on the performance of the virtual machine.

In some embodiments, the virtual machine may monitor its resource utilization and determine, based on the resource state policy, what resource state the virtual machine is in. The virtual machine may then transmit its resource state to the host machine when requesting an increased allocation of system resources.

After determining a resource state for the virtual machine at operation 202, the computer system may determine whether adjustments of resource entitlements are allowed for the virtual machine at decision block 203. The computer system may compare the resource state of the virtual machine to a resource adjustment policy to determine whether the resource entitlement adjustment may be granted.

In some embodiments, every virtual machine managed by the computer system may have the same resource adjustment policy. In other embodiments, each virtual machine may be independently assigned a resource adjustment policy. In some embodiments, a virtual machine's resource adjustment policy may be based on the resource template type, or the resource state policy, assigned to the virtual machine. An example resource adjustment policy is discussed in detail in reference to FIG. 3B.

If the computer system determines that it cannot adjust the resource entitlement at decision block 203, the method 200 may end. Otherwise, the computer system may determine a maximum amount of the system resource that can be allocated to the virtual machine at operation 204. The computer system may use the resource adjustment policy to determine the maximum amount of the system resource that may be allocated to the virtual machine.

The resource adjustment policy may indicate the maximum resource adjustment (e.g., as a gross amount or as a percentage of currently allocated resources) allowed based on the resource state of the virtual machine. In some embodiments, each resource state may have a different associated maximum resource adjustment. For example, virtual machines in the critical resource state may be allowed to receive an adjustment of up to 100% of their current resource entitlement. As such, a virtual machine that is currently allocated 4 GB of memory may receive up to an additional 4 GB of memory if the virtual machine is in the critical resource state. Meanwhile, virtual machines in the elevated resource state may receive an adjustment of up to 50% of their current resource entitlements. Accordingly, a virtual machine in the elevated resource state with resource entitlements of 1 TB of storage may receive up to an additional 500 GB of storage.

In some embodiments, the message may include the total requested amount of the system resource, and not the adjustment amount. For example, a virtual machine may have an initial allocation of 4 GB of memory. The user may request an allocation of 6 GB of memory total, instead of requesting an additional 2 GB or an additional 50%. The computer system may apply the maximum adjustment to the current allocation to determine the maximum amount of the system resource that the virtual machine may have allocated to it.

After determining the maximum amount of the system resource that can be allocated to the virtual machine at operation 204, the computer system may determine whether to allocate the requested amount of the system resource at decision block 205. The computer system may compare the requested amount of the system resource to the maximum amount allowed according to the resource adjustment policy for the virtual machine. If the requested amount is less than, or equal to, the maximum amount, the computer system may determine that it can allocate the requested amount of the system resource to the virtual machine. If the requested amount is greater than the maximum amount, the computer system may determine that it cannot allocate the requested amount of the system resource to the virtual machine.

If the computer system determines that it can't allocate the requested amount of the system resource at decision block 205, the method 200 may end. Otherwise, the computer system may determine that the request is approved and may temporarily allocate the requested amount of the system resource to the virtual machine at operation 206 and the method 200 may end.

In some embodiments, the adjustment to the resource entitlement may be granted for a specific period of time. After the specific period of time elapses, the computer system may deallocate the additional system resource, reverting the resource entitlement for the virtual machine back to its default amount. The amount of time that the virtual machine may utilize the increased amount of system resources may depend on the resource state of the virtual machine at the time it requested the adjustment. For example, virtual machines in the elevated resource state may only receive additional resources for 1 hour, whereas virtual machines in the critical resource state may receive additional resources for 4 hours. The amount of time of the resource entitlement adjustment may be specified by the resource adjustment policy for the virtual machine.

In some embodiments, the computer system may allocate the maximum amount allowed if it determines that it cannot allocated the requested amount of the system resource. For example, a user may request an 8 GB allocation of memory for a virtual machine that currently has 4 GB of memory allocated to it. The computer system may determine that the maximum amount of memory that it can allocate to the virtual machine is 6 GB (e.g., because the virtual machine is in the elevated resource state and not the critical resource state). Instead of rejecting the request completely, the computer system may instead allocate 6 GB of memory to the virtual machine.

In some embodiments, the computer system may notify the user that the requested adjustment of a system resource was either granted or denied, and, if granted, for how long the additional resource will be allocated to the virtual machine. If the computer system allocated a different amount that requested (e.g., if the computer system allocated the maximum amount it could, which was less than the requested amount), the computer system may notify the user that it did not allocate the full requested amount. The computer system may also notify the user of the amount that was allocated, and a reason why the full requested amount was not allocated.

FIG. 3A illustrates an example resource state policy 300 for a virtual machine, in accordance with embodiments of the present disclosure. Each row 301-304 may correspond to a different resource state of the virtual machine. For example, the first row 301 may correspond to the low resource state. Each column 305-308 may correspond to a different system resource or time requirements for the resource states. The columns 305-308 may set thresholds for each system resource that must be met, for at least one system resource, for a virtual machine to be in the resource state.

For example, the first column 305 may include resource state thresholds for CPU utilization. Each resource state threshold in the first column 305 may correspond to a particular resource state. For example, the CPU resource state threshold for the low resource state is 75%, meaning that a virtual machine may be in the low resource state if it is using more than 75% of its allocated CPU entitlement. If the virtual machine is using less than 75% of its allocated CPU entitlement, the virtual machine may be in the normal resource state (not shown) and may not be entitled to any resource adjustments. As another example, the CPU resource state threshold for the medium resource state is 80%, meaning that a virtual machine using between 80% and 90% of its allocated CPU entitlement is in the medium resource state. Likewise, the second column 306 may include resource state thresholds for memory, and the third column 307 may include resource state thresholds for storage. The fourth column 308 may establish the amount of time that the resource utilization level must exceed a resource state threshold in order for the virtual machine to be in a particular resource state.

A computer system or module (e.g., a VM resource allocator) may compare the virtual machine's utilization levels of CPU, memory, and storage to the resource state policy 300. If any utilization level exceeds a threshold for a specific resource state established by the resource state policy 300 for at least a period of time specified by the resource state policy, the virtual machine may be determined to be in the specific resource state. For example, in order for a virtual machine to be in the critical resource state, at least one of the CPU, memory, or storage utilization for the virtual machine must exceed 95% for at least 5 minutes.

While the resource state thresholds for a particular resource state are all the same in FIG. 3A (e.g., the CPU, memory, and storage threshold for the low resource state are all 75%), this may not always be the case. In some embodiments, a resource state may have a different resource state threshold for each of the system resources. For example, the low resource state may have a 60% threshold for CPU utilization, a 70% threshold for memory utilization, and a 75% threshold for storage utilization. Likewise, in some embodiments, each system resource may have a different time threshold. For example, a virtual machine may be in the low resource state if its CPU utilization exceeds the CPU resource state threshold (e.g., 75%) for more than 30 minutes, if its memory utilization exceeds the memory resource state threshold for more than 45 minutes, or if its storage utilization exceeds the storage resource state threshold for more than 1 hour.

FIG. 3B illustrates an example resource adjustment policy 310 for a virtual machine, in accordance with embodiments of the present disclosure. Each row 311-314 may correspond to a different resource state of the virtual machine. For example, the first row 311 may correspond to the low resource state. The first column 315 may indicate the maximum resource adjustment that is allowed for virtual machines in a particular resource state. The second column 316 may indicate the maximum amount of time for which the resource adjustment may be granted.

For example, the low resource state (row 311) may have a maximum resource adjustment of 10% of its currently allocated resources. The additional 10% may be granted for up to 30 minutes. Likewise, the critical resource state (row 314) may have a maximum resource adjustment of 100% for up to 4 hours. For example, a virtual machine with an initial memory entitlement of 2 GB may request up to an additional 2 GB of memory (for a total of 4 GB) if it is in the critical resource state. The computer system that receives a request for an adjustment to a resource entitlement for a virtual machine may use the resource adjustment policy 310 to determine whether to grant the adjustment, and an amount of additional resources that can be allocated to the virtual machine (and for how long).

While the maximum resource adjustments shown in the resource adjustment policy 310 apply to all system resources, this may not always be the case. In some embodiments, a resource state may have a different maximum resource adjustment amount for each of the system resources. For example, the low resource state may have a 10% maximum adjustment amount for CPU, a 15% maximum adjustment amount for memory, and a 5% maximum adjustment amount for storage. Likewise, in some embodiments, each system resource may have a different maximum adjustment time. For example, a virtual machine in the low resource state may have a maximum adjustment time of 30 minutes for its CPU adjustment, a maximum adjustment time of 45 minutes for its memory adjustment, and a maximum adjustment time of 1 hour for its storage adjustment.

Figure 4:
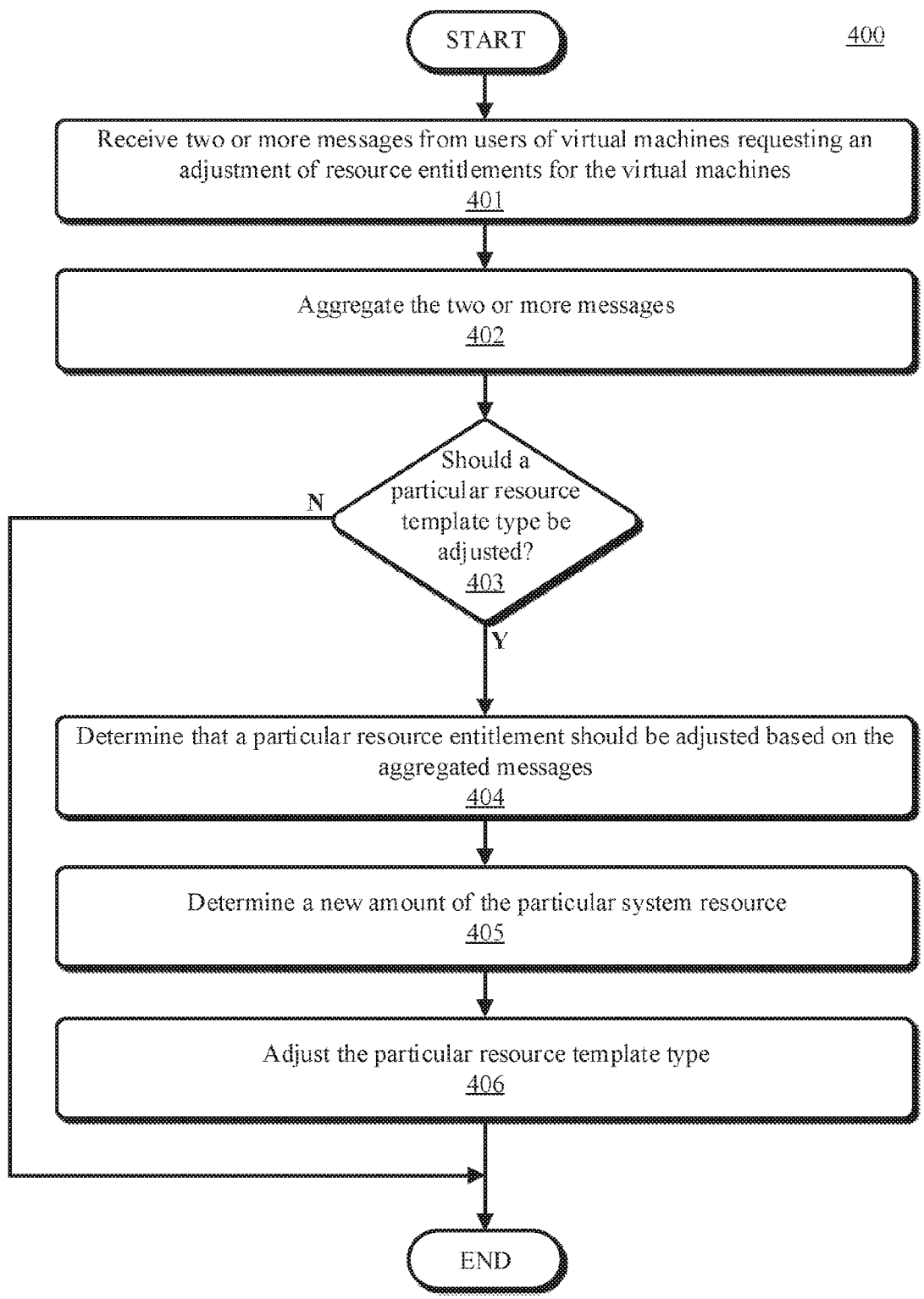
FIG. 4 illustrates a flowchart of an example method for adjusting a resource template used by one or more virtual machines based on user feedback, in accordance with embodiments of the present disclosure.

FIG. 4 illustrates a flowchart of an example method 400 for adjusting a resource template used by one or more virtual machines based on user feedback, in accordance with embodiments of the present disclosure. The method 400 may be performed by a computer system, such as the host machine 122 (shown in FIG. 1). In some embodiments, one or more steps or operations of method 400 may be performed by a user, or by the computer system in response to user input. The method 400 may begin at operation 401, where the computer system may receive two or more messages from users of virtual machines requesting an adjustment of resource entitlements for the virtual machines.

The virtual machines may have associated resource templates. The virtual machines may be assigned their associated resource templates by the computer system, or by a module running thereon (e.g., the VM resource allocator 134 in FIG. 1). The VM resource allocator may select from one or more predetermined resource template types when assigning the resource template to the virtual machine. Each resource template type may specify a different allocation of system resources (e.g., CPU, memory, storage).

In some embodiments, each of the two or more messages may include a request for an adjustment of a particular resource entitlement. The particular resource entitlement may be associated with a particular system resource (e.g., CPU, memory, storage) for which the user is requesting an increased allocation. The request may also include a requested amount of the particular system resource desired by the user. The requested amount of the system resource may be greater than the amount currently allocated to the virtual machine according to the resource entitlement.

In some embodiments, at least one of the two or more messages may include requests for adjustments to more than one resource entitlement. For example, a user may decide that the virtual machine he is using needs additional memory and storage. Accordingly, the user may send a message to a host machine requesting an adjustment to a first resource entitlement (e.g., corresponding to memory) and a second resource entitlement (e.g., corresponding to storage). The message may include an amount of each system resource requested. For example, the message may indicate that the user would like 8 GBs of memory (e.g., increased from the 4 GB specified by the first resource entitlement) and 2 TB of storage (e.g., increased from the 1 TB specified by the second resource entitlement).

In some embodiments, at least one of the two or more messages may include a request to lower the amount of a system resource allocated to the virtual machine. This may be done if the amount that the user pays to use the virtual machine is based, at least in part, on the allocation of system resources to the user. In some embodiments, the at least one message may include a request to increase the amount of a first system resource (e.g., memory) allocated to the virtual machine and decrease the amount of a second system resource (e.g., storage) allocated to the virtual machine. In some embodiments, each message may also include a template ID for the resource template type that is assigned to the virtual machine sending the message. The template ID may be used by the computer system to determine which resource template type has been assigned to the virtual machine as well as the resource entitlements for the virtual machine.

After receiving the two or more messages at operation 401, the computer system may aggregate the two or more messages at operation 402. The aggregating may include grouping the messages together according to specific characteristics found in the messages. For example, the computer system may aggregate the two or more messages based on the resource template type assigned to the virtual machines from which the messages were sent.

In some embodiments, the two or more messages may be aggregated based on more than one characteristic of the message or of the request. For example, the computer system may aggregate the two or more messaged based on the resource template type and the specific system resource (or resource entitlement), such as the CPU or memory, for which an adjustment is requested. Other characteristics of the message that are considered when aggregating the messages include, but are not limited to, the requested adjustment amount of the system resource, the resource state of the virtual machine, the length of time for which the adjustment is requested, and the time when the message was sent. An illustrative example of how the computer system may aggregate the two or more received messages is also discussed in reference to FIGS. 5A and 5B.

After aggregating the two or more message at operation 402, the computer system may determine whether a particular resource template type should be adjusted at decision block 403. The computer system may receive messages from a plurality of virtual machines. Each virtual machine may have an associated resource template. The resource templates may correspond to a set of (i.e., one or more) resource template types. The computer system may decide whether to adjust one or more of the resource template types based on the number of aggregated messages received from virtual machines using the resource template type. In some embodiments, the computer system may ignore numerous requests from the same virtual machine, especially if they are requesting an adjustment to a resource entitlement for the same system resource. For example, a first virtual machine may send 10 messages requesting additional memory. The computer system may only count the most recent request when deciding whether to adjust the resource template type for the first virtual machine. The computer system may ignore the other requests to ensure that a user of a virtual machine cannot spam the computer system in the hopes of receiving a permanent adjustment to the resource template type that it uses.

In some embodiments, the computer system may compare the number of messages received from virtual machines using a particular resource template type to a threshold. If the number of received messages exceeds the threshold, the computer system may determine that at least one of the resource entitlements for the particular resource template type should be changed. In some embodiments, the computer system may determine, based on the number of messages received corresponding to a particular resource template type and the number of virtual machines associated with the particular resource template type, a percentage of virtual machines associated with the particular resource template type that have requested an adjustment. The computer system may then compare the percentage to a threshold. If the percentage exceeds the threshold, the computer system may determine that the particular resource template type should be adjusted.

In some embodiments, the number (or percentage) may be based on the combination of the characteristics used in aggregating the messages. For example, the computer system may have aggregated the messages according to the resource template type and the specific system resource for which an adjustment is requested. The computer system may determine the number of requests for each combination of resource template type and system resource. The computer system may then compare this number to a threshold. If the number of received messages requesting an adjustment to a specific system resource for a virtual machine using the particular resource template type exceeds the threshold, the computer system may determine that at least one of the resource entitlements for the particular resource template type should be changed.

If the computer system determines that none of the resource template types should be changed at decision block 403, the method 400 may end. If, however, the computer system determines that a particular resource template type should be adjusted at decision block 403, the computer system may determine that a particular resource entitlement should be changed for the particular resource template type at operation 404. The computer system may determine, for each system resource, a number of messages in the two or more messages that requested an adjustment to the system resource. The computer system may only consider messages that were sent by virtual machines that use the particular resource template type that it decided should be adjusted in decision block 403. The computer system may then compare the number of messages for each system resource to a threshold for that system resource. If the number exceeds the threshold for a particular system resource, the computer system may determine that the resource entitlement for the particular system resource should be adjusted.

For example, the computer system may identify 20 messages requesting additional resources that emanated from the virtual machines using the particular resource template type. 10 of the messages may have requested additional CPU, 7 may have requested additional memory, and 5 may have requested additional storage. The sum of the numbers of messages requesting each system resource may add up to more than the total number of messages received because a single message may request an adjustment to more than one system resource. The computer system may then compare the numbers of messages for each system resource to a threshold (e.g., 8 messages). Based on the comparing, the computer system may determine that only the resource entitlement relating to the CPU allocation should be adjusted because it is the only one that exceeded the threshold.

In some embodiments, each resource entitlement (or associated system resource) may have its own threshold. For example, the CPU threshold may be 8 messages, the memory threshold may be 10 messages, and the storage threshold may be 20 messages. In some embodiments, the thresholds may be based on the percentage of virtual machines requesting adjustments to the particular resource entitlements. For example, the computer system may determine that a particular resource entitlement in a particular resource template type should be adjusted if more than 10% of virtual machines using the resource template type have requested an adjustment to the particular resource entitlement.

After determining that a particular resource entitlement should be adjusted at operation 404, the computer system may determine a new amount of the particular system resource associated with the particular resource entitlement at operation 405. There are numerous ways that the computer system may determine the new amount of the particular system resource.

In some embodiments, the computer system may determine the new amount of the particular system resource to be the largest amount requested by a virtual machine. For example, a first virtual machine may have requested 8 GB of memory (e.g., an increase from 4 GB allocated according to the resource entitlement), and a second virtual machine may request 16 GB. Accordingly, the computer system may determine that the new amount of the particular system resource should be 16 GB.

In some embodiments, the computer system may determine the new amount of the particular system resource to be substantially (e.g., within 10% of) the average of the requested amount. For example, a first virtual machine may have requested 8 GB of memory, a second may have requested 12 GB of memory, and a third may have requested 16 GB of memory. The computer system may average the three requests and determine that the new amount should be 12 GB of memory.

Other methods for determining the new amount of a particular system resource to allocate to virtual machines using the particular resource template type will be readily apparent to a person of ordinary skill. For example, other statistical metrics (e.g., mean, minimum) may be used. The present disclosure should not be limited to the examples described herein, which are used for illustrative purposes only.

After determining the new amount of the particular system resource at operation 405, the computer system may adjust the particular resource template type at operation 406. The adjusting may include changing the particular resource entitlement such that the new amount of the particular system resource is allocated to virtual machines using the particular resource template type.

In some embodiments, the computer system may only adjust the particular resource template type for a subset of virtual machines. The subset of virtual machines may include only the virtual machines that requested the adjustment to the particular resource entitlement. The computer system may adjust the particular resource template type by creating a new resource template type based on the particular resource template type. The computer system may then assign the new resource template type to the subset of virtual machines. After the computer system adjusts the particular resource template type, the method 400 may end.

FIG. 5A illustrates an example set 500 of seven messages requesting an adjustment to a resource entitlement, in accordance with embodiments of the present disclosure. The set of seven messages are represented using a table. Each row in the table may correspond to a different message. For example, the first row may correspond to a first message, while the second row may correspond to a second message.

Each message may include a message number (shown in the first column 501), a template ID (shown in the second column 502), a virtual machine (VM) ID (shown in the third column 503), and a requested system resource type (shown in the fourth column 504). The message number may identify the message based on the order in which it was received with respect to the other messages. For example, the first message (shown in the first row) may be the first message received by a computer system (or module thereof, such as the VM resource allocator 134 in FIG. 1).

The template ID may be a unique identifier that identifies which resource template type is used by the virtual machine that sent the message. For example, the first message may have a template ID of "1," indicating that the virtual machine that sent the first message uses a first resource template type. Likewise, the second message (seen in the second row) has a template ID of "3," indicating that the virtual machine that sent the second message uses a third resource template type.

The VM ID may be a unique identifier assigned to the virtual machines that sent the message. The VM ID may be an IP address (particularly if static IP addresses are used), a media access control (MAC) address, or any other identifier used to determine which virtual machine sent the message. The requested system resource type may indicate the system resource (or resource entitlement) for which the message requests an adjustment.

FIG. 5B illustrates the set 500 of seven messages from FIG. 5A aggregated into three groups 511, 512, and 513 (collectively referred to as the set of aggregated messages 510) according to the resource template type associated with the virtual machines requesting the adjustments to a resource entitlement, in accordance with embodiments of the present disclosure. The first group 511 includes each of the messages that were sent by virtual machines associated with the first resource template type. Likewise, the second group 512 includes the message that was sent by a virtual machine associated with the second resource template type, and the third group 513 includes each of the messages that were sent by virtual machines associated with the first resource template type. As before, each message includes the message number (shown in the first column 501), the template ID (shown in the second column 502), the VM ID (shown in the third column 503), and the requested system resource type (shown in the fourth column 504).

The aggregated messages in FIG. 5B are shown for illustrative purposes only. In some embodiments, the computer system may only identify the resource template type (or other characteristic of the messages, such as requested system resource) in the messages in order to aggregate the message. Aggregated the messages, as used herein, may not require the computer system to move, sort, store, or modify the messages, nor does it require the computer system to create any associations between the messages.

Figure 6:
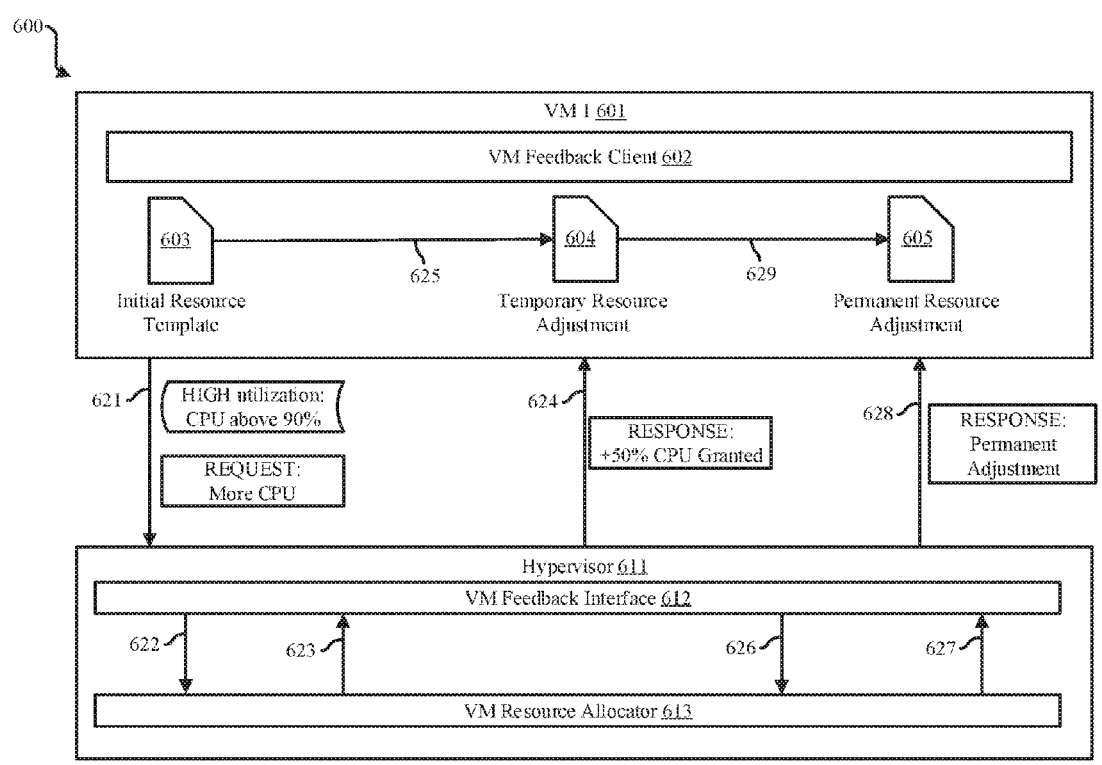
FIG. 6 illustrates a block diagram of an example high level logical architecture of a system for adjusting a resource template based on user feedback, in accordance with embodiments of the present disclosure.

FIG. 6 illustrates a block diagram of an example high level logical architecture 600 of a system for adjusting a resource template based on user feedback, in accordance with embodiments of the present disclosure. The system may include a hypervisor 611 and a first virtual machine 601 hosted on the hypervisor. The virtual machine 601 may have a VM feedback client 602 and an initial resource template 603. The VM feedback client 602 may allow a user to provide feedback requesting an adjustment to a resource entitlement established in the initial resource template 603. In some embodiments, the VM feedback client 602 may be the same as, or substantially similar to, the VM feedback client 148 in FIG. 1.

The hypervisor 611 may include a VM feedback interface 612 and a VM resource allocator 613. The VM feedback interface 612 may communicatively couple the VM resource allocator 613 and the virtual machine 601, allowing a user of the virtual machine to send requests for additional system resources to the VM resource allocator. The VM resource allocator 613 may be configured to receive the requests and determine whether to grant or deny the requests. The VM resource allocator 613 may also be configured to aggregate a plurality of requests from one or more virtual machines to determine whether a resource template type should be adjusted.

A user of the virtual machine 601 may determine that his CPU utilization is high (e.g., above 90%). The user may determine that the CPU utilization is high using the VM feedback client 602, or using another module installed on the virtual machine 601, such as a resource monitor. The user may then send a request for additional CPU to the VM resource allocator 613 at operation 621. The request may be received by the VM feedback interface 612, who may pass the request along to the VM resource allocator 613 at operation 622. The VM resource allocator 613 may determine whether to grant the request using a resource state policy and a resource adjustment policy, as described in reference to FIG. 2.

The VM resource allocator 613 may determine that the request is granted and may forward a response to the VM feedback interface 612 at operation 623. The VM feedback interface 612 may then transmit the response to the first virtual machine 601 at operation 624. In response to receiving the response, the virtual machine 301 may temporarily adjust its resource template at operation 625. The virtual machine 601 may use the temporary resource template 604 for a period of time specified by the VM resource allocator 613 in the response, or until it receives a different resource template from the VM resource allocator 613.

After the request has been granted, VM resource allocator 613 may continue to receive requests from virtual machines. The VM feedback interface 612 may transmit those requests to the VM resource allocator 613 at operation 626. The VM resource allocator 613 may aggregate the requests and determine whether to adjust a resource template type, as discussed in reference to FIG. 4. Based on the number of received requests, the VM resource allocator 613 may determine that it should update the resource template type. The VM resource allocator 613 may generate a message or response to all virtual machines using the resource template type (or a subset of the virtual machines that requested additional resource), including the first virtual machine 601. The message may inform the virtual machines that at least one of their resource entitlements needs be adjusted. The VM resource allocator 613 may forward the responses to the VM feedback interface 612 at operation 627. The VM feedback interface 612 may then transmit the responses to the effected virtual machines, including to the first virtual machine 601, at operation 628. The first virtual machine 601 may receive the response that its resource template needs to be adjusted and, may generate a new, permanent resource template 605 at operation 629.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
    assigning a resource template to each virtual machine of a plurality of virtual machines executing on one or more host machines, each resource template being associated with a resource template type that establishes a first set of resource entitlements for one or more system resources allocated to the associated virtual machine, each resource entitlement of the first set of resource entitlements corresponding to a system resource;
    receiving two or more messages, the two or more messages being sent by users of one or more virtual machines of the plurality of virtual machines, each message requesting an adjustment of at least one resource entitlement for the virtual machine, wherein each message further includes a resource template type ID of the resource template type associated with the virtual machine from which the message was sent;
    aggregating the two or more messages based on at least the associated resource template type IDs of the virtual machines from which the two or more messages were sent and the system resource for which the two or more messages request an adjustment;
    determining, based on the two or more aggregated messages and the resource states of the one or more virtual machines, whether a particular resource template type used by one or more virtual machines associated with at least one of the two or more messages should be adjusted; and
    adjusting, in response to determining that the particular resource template type should be adjusted, the virtual machines associated with the particular resource template type ID.

2. The method of claim 1, wherein the adjusting the virtual machines associated with the particular resource template type ID comprises:
    identifying a first set of aggregated messages, each message of the first set of aggregated messages being sent by a virtual machine associated with the particular resource template type, each message of the first set of aggregated messages including a requested amount of a first system resource, the requested amount of the first system resource being greater than an amount of the first system resource established by the particular resource template type;
    determining a second amount of the first system resource, the second amount being based on the requested amounts of the first system resource; and
    increasing the amount of the first system resource in the particular resource template type to the second amount of the first system resource.

3. The method of claim 2, wherein the second amount is substantially an average of the requested amounts.

4. The method of claim 1, wherein two or more virtual machines are associated with the particular resource template type, and wherein the adjusting the virtual machines associated with the particular resource template type ID is done for a subset of the two or more virtual machines, the subset of the two or more virtual machines being the virtual machines from which the two or more messages requesting the adjustment of resource entitlements were sent, wherein the subset does not include all of the two or more virtual machines associated with the particular resource template type.

5. The method of claim 1, wherein the one or more system resources include at least one selected from a group consisting of CPU, memory, and storage.

6. The method of claim 1, wherein the two or more messages include a first message, the first message including a request to adjust a first resource entitlement in the set of resource entitlements for a first virtual machine, the first resource entitlement including a first amount of a first system resource allocated to the first virtual machine, the request including a requested amount of the first system resource, the method further comprising:

determining a resource state of the first virtual machine;

determining, based on the resource state of the first virtual machine, a maximum amount of the first system resource that can be allocated to the first virtual machine; and determining, based on the requested amount of the first system resource and the maximum amount of the first system resource, whether to allocate the requested amount of the first system resource to the first virtual machine, wherein the requested amount of the first system resource is allocated if it is less than the maximum amount of the first system resource.

7. The method of claim 6, wherein the determining the resource state of the first virtual machine comprises:

determining, using a resource state policy, whether a resource utilization level of the first system resource has exceeded a predetermined resource threshold for a predetermined amount of time, wherein the resource state policy includes the predetermined resource threshold and the predetermined amount of time.

8. The method of claim 6, wherein the determining the maximum amount of the first system resource that can be allocated to the first virtual machine comprises:

determining, using a resource adjustment policy for the first virtual machine, a maximum resource adjustment for the first system resource, wherein the resource adjustment policy establishes the maximum resource adjustment for the first system resource based on the resource state of the first virtual machine, and wherein the resource state of the first virtual machine is based on a resource utilization level of the first system resource; and applying the maximum resource adjustment to the first amount of the first system resource.

9. The method of claim 6, the method further comprising:

allocating, for a period of time and in response to determining that the requested amount of the first system resource should be allocated to the first virtual machine, the requested amount of the first system resource to the first virtual machine; and deallocating, when the period of time has elapsed, the requested amount of the first system resource from the first virtual machine.

10. The method of claim 6, the method further comprising:

determining, in response to determining that the requested amount of the first system resource should not be allocated to the first virtual machine, whether to allocate a second amount of the first system resource to the first virtual machine, the second amount of the first system resource being less than the requested amount and more than the first amount;

allocating, for a period of time and in response to determining that the second amount of the first system resource should be allocated to the first virtual machine, the second amount of the first system resource to the first virtual machine; and deallocating, when the period of time has elapsed, the second amount of the first system resource from the first virtual machine.

11. The method of claim 10, wherein the second amount is the maximum amount of the first system resource that can be allocated to the first virtual machine.

12. The method of claim 6, the method further comprising:

determining, based on the resource state of the first virtual machine and a resource adjustment policy for the first virtual machine, that the requested amount of the first system resource should not be allocated to the first virtual machine; and notifying, in response to determining that the requested amount of the first system resource should not be allocated to the first virtual machine, the user that the request is not approved.

13. The method of claim 6, the method further comprising:

determining that the resource state of the first virtual machine has changed; and notifying, in response to determining that the resource state of the first virtual machine has changed, the user that the resource state of the first virtual machine has changed.

14. The method of claim 6, wherein the request further includes a user ID of the user, a virtual machine ID of the first virtual machine, the resource state for the first virtual machine, a user-generated explanation of why the requested amount of the first system resource is requested, and a timestamp.

15. The method of claim 6, wherein the first virtual machine and a resource allocator are executing on a hypervisor running on a host machine, the first virtual machine includes a virtual machine feedback client, and wherein the request is sent using the virtual machine feedback client and received by the resource allocator.

16. The method of claim 6, wherein the set of resource entitlements includes default resource entitlements, the default resource entitlements being the resource entitlements allocated to the first virtual machine when the first virtual machine is initialized.

17. The method of claim 1, wherein the determining, based on the two or more aggregated messages and the resource states of the one or more virtual machines, whether the particular resource template type should be adjusted comprises:

identifying a first set of messages, wherein the first set of messages were sent by virtual machines associated with the particular resource template type within a predetermined period of time, each message in the first set of messages requesting an increase in the allocated amount of a particular system resource;

determining a number of messages in the first set of messages; and comparing the number of messages in the first set of messages to a threshold, wherein the threshold is associated with the particular system resource.

18. The method of claim 1, wherein the determining, based on the two or more aggregated messages and the resource states of the one or more virtual machines, whether the particular resource template type should be adjusted comprises:

identifying a first set of messages, wherein the first set of messages were sent by virtual machines associated with the particular resource template type within a predetermined period of time, each message in the first set of messages requesting an increase in the allocated amount of a particular system resource;

determining a number of virtual machines from which a message in the first set of messages was sent;

determining a number of virtual machines associated with the particular resource template type;

determining a percentage of virtual machines associated with the particular resource template type that requested an increase in the allocated amount of the particular system resource; and comparing the percentage of virtual machines to a threshold.

19. A system comprising:

a memory;

a processor in communication with the memory, the processor being configured to perform a method comprising:

assigning a resource template to each virtual machine of a plurality of virtual machines executing on one or more host machines, each resource template being associated with a resource template type that establishes a first set of resource entitlements for one or more system resources allocated to the associated virtual machine, each resource entitlement of the first set of resource entitlements corresponding to a system resource;

receiving two or more messages, the two or more messages being sent by users of one or more virtual machines of the plurality of virtual machines, each message requesting an adjustment of at least one resource entitlement for the virtual machine, wherein each message further includes a resource template type ID of the resource template type associated with the virtual machine from which the message was sent;

aggregating the two or more messages based on at least the associated resource template type IDs of the virtual machines from which the two or more messages were sent and the system resource for which the two or more messages request an adjustment;

determining, based on the two or more aggregated messages and the resource states of the one or more virtual machines, whether a particular resource template type used by one or more virtual machines associated with at least one of the two or more messages should be adjusted; and adjusting, in response to determining that the particular resource template type should be adjusted, the virtual machines associated with the particular resource template type ID.

20. The system of claim 19, wherein the method performed by the processor further comprises:

identifying, in response to determining that the particular resource template type should be adjusted, a first set of aggregated messages, each message of the first set of aggregated messages being sent by a virtual machine associated with the particular resource template type, each message of the first set of aggregated messages including a requested amount of a first system resource, the requested amount of the first system resource being greater than an amount of the first system resource established by the particular resource template type;

determining a second amount of the first system resource, the second amount being based on the requested amounts of the first system resource; and increasing the amount of the first system resource in the particular resource template type to the second amount of the first system resource.

21. The system of claim 19, wherein the two or more messages include a first message, the first message including a request to adjust a first resource entitlement in the set of resource entitlements for a first virtual machine, the first resource entitlement including a first amount of a first system resource allocated to the first virtual machine, the request including a requested amount of the first system resource, the method further comprising:

determining a resource state of the first virtual machine;

determining, using a resource adjustment policy that establishes a maximum resource adjustment for the first virtual machine based on the resource state of the first virtual machine, a maximum amount of the first system resource that can be allocated to the first virtual machine; and determining, based on the requested amount of the first system resource and the maximum amount of the first system resource, whether to allocate the requested amount of the first system resource to the first virtual machine.

22. A computer program product comprising a computer readable storage medium having program instructions embodied therewith, the program instructions executable by a processor to cause the processor to perform a method comprising:

assigning a resource template to each virtual machine of a plurality of virtual machines executing on one or more host machines, each resource template being associated with a resource template type that establishes a first set of resource entitlements for one or more system resources allocated to the associated virtual machine, each resource entitlement of the first set of resource entitlements corresponding to a system resource;

receiving two or more messages, the two or more messages being sent by users of one or more virtual machines of the plurality of virtual machines, each message requesting an adjustment of at least one resource entitlement for the virtual machine, wherein each message further includes a resource template type ID of the resource template type associated with the virtual machine from which the message was sent;

aggregating the two or more messages based on at least the associated resource template type IDs of the virtual machines from which the two or more messages were sent and the system resource for which the two or more messages request an adjustment;

determining, based on the two or more aggregated messages and the resource states of the one or more virtual machines, whether a particular resource template type used by one or more virtual machines associated with at least one of the two or more messages should be adjusted; and adjusting, in response to determining that the particular resource template type should be adjusted, the virtual machines associated with the particular resource template type ID.

23. The computer program product of claim 22, wherein the method performed by the processor further comprise:

identifying, in response to determining that the particular resource template type should be adjusted, a first set of aggregated messages, each message of the first set of aggregated messages being sent by a virtual machine associated with the particular resource template type, each message of the first set of aggregated messages including a requested amount of a first system resource, the requested amount of the first system resource being greater than an amount of the first system resource established by the particular resource template type;

determining a second amount of the first system resource, the second amount being based on the requested amounts of the first system resource; and increasing the amount of the first system resource in the particular resource template type to the second amount of the first system resource.

\* \* \* \* \*